United States Patent
Rotelli

(10) Patent No.: US 7,249,724 B2
(45) Date of Patent: Jul. 31, 2007

(54) COMPACT DISC DESTRUCTION DEVICE

(76) Inventor: Eric Rotelli, 104 Wood Dr., Algonquin, IL (US) 60102

( * ) Notice: Subject to any disclaimer, the term of this patent is extended or adjusted under 35 U.S.C. 154(b) by 500 days.

(21) Appl. No.: 10/941,363

(22) Filed: Sep. 15, 2004

(65) Prior Publication Data

US 2005/0132394 A1 Jun. 16, 2005

Related U.S. Application Data

(60) Provisional application No. 60/503,130, filed on Sep. 15, 2003.

(51) Int. Cl.
*B02C 19/00* (2006.01)
(52) U.S. Cl. .................. 241/169; 241/169.2; 241/264; 225/103
(58) Field of Classification Search ........ 241/DIG. 27, 241/169, 169.2, 264; 225/103
See application file for complete search history.

(56) References Cited

U.S. PATENT DOCUMENTS 4,473,192 A * 9/1984 Urban et al. ................. 241/168
4,887,755 A * 12/1989 Gibilisco ..................... 225/103
5,118,021 A * 6/1992 Fiocchi ....................... 225/103

* cited by examiner

*Primary Examiner*—Mark Rosenbaum
(74) *Attorney, Agent, or Firm*—McAndrews, Held & Malloy, Ltd.

(57) ABSTRACT

An apparatus for destroying compact discs includes a base and a cover. The base has a mounting fixture capable of holding a CD and an anvil projecting upwardly from the base bottom panel. The cover is hingedly attached to one of the base walls such that the cover can assume an open position in which the apparatus interior is accessible and a closed position in which the apparatus interior is inaccessible. The cover has one or more scatter shields projecting downwardly from the cover such that, in the cover's closed position, the scatter shields prevent the apparatus interior contents from escaping. The cover further includes a compressor projecting downwardly from the cover top panel. In operation, mounting a CD in the mounting fixture and urging the cover from the open position to the closed position induces the compressor to urge the CD against the anvil to shatter the CD.

5 Claims, 6 Drawing Sheets

COMPACT DISC DESTRUCTION DEVICE

CROSS-REFERENCE TO RELATED APPLICATION(S)

The present application is related to and claims priority benefits from U.S. Provisional Patent Application Ser. No. 60/503,130 filed on Sep. 15, 2003, entitled "Compact Disc Construction Device". The '130 provisional application is hereby incorporated by reference herein in its entirety.

FIELD OF THE INVENTION

The present invention relates to the destruction of shatterable discs such as, for example, compact discs, and the data stored thereon. More particularly, the present invention relates to a device for physically destroying such discs.

BACKGROUND OF THE INVENTION

The problem the present device is directed to overcoming is the prevention of unauthorized access to data on discarded discs with a magnetic medium on their surface(s) for the storage of digital information. Such discs include compact discs (CDs), digital video discs (DVDs; sometimes referred to as digital versatile discs), and compact minidiscs (smaller in diameter than conventional CDs; used in digital photography and other end uses in which a smaller digital storage medium is desired). Herein, the term "compact disc" and the abbreviation "CD" should be understood to encompass these and other shatterable discs on or in which some perceivable information has been imparted. Such discs are most often formed from plastic material, but the discs could conceivably formed from other suitable materials having the capability of shattering like CDs.

One prior, conventional solution to this problem involved obliterating the data stored on compact discs by imposing magnetic fields upon the surface of the discs, thereby affecting the electromagnetic properties of the disc and the data stored thereon. The disadvantage of the magnetization approach is the uncertainty as to whether the data has been completely obliterated rather than rendered only partially unreadable, in which case some of the data stored on the CD could still be retrieved.

Another prior, conventional solution involved scratching or otherwise physically marring the readable surface of the CD, thereby rendering the scratched or marred portions of the surface unreadable. Like the prior magnetization approach, the disadvantage of the physical marring approach is also that the data could have been rendered only partially unreadable rather than completely obliterated, in which case some of the data stored on the CD could still be retrieved, especially from the unmarred portions.

Solutions involving the melting or burning to destroy of a CD to render the data thereon inaccessible are also disadvantageous. In this regard, the melting or burning cannot normally be accomplished in the workplace, but is more often carried out by an outside service. Entrusting a CD with sensitive data to an outsider for destruction also carries with it a finite risk that the secrecy of the data will be compromised, either accidentally or perhaps by subversive means.

SUMMARY OF THE INVENTION

The above and other shortcomings of prior, conventional solutions are overcome by an apparatus for destroying a shatterable planar object. The apparatus includes:

(a) a base comprising a bottom panel and a plurality of walls projecting upwardly from each of the bottom panel edges, the base comprising a mounting fixture capable of holding the shatterable planar object, the base further comprising an anvil projecting upwardly from the bottom panel;

(b) a cover comprising a top panel and a plurality of walls projecting downwardly from the top panel edge, the cover hingedly attached to one of the base walls such that the cover is capable of assuming an open position in which the apparatus interior is accessible from the apparatus exterior and a closed position in which the apparatus interior is inaccessible from the apparatus exterior, the cover further comprising at least one scatter shield projecting downwardly from the top panel such that, in the closed position, the at least one scatter shield prevents the apparatus interior contents from escaping to the apparatus exterior, the cover further comprising a compressor projecting downwardly from the top panel.

In operation, mounting a shatterable planar object in the mounting fixture and urging the cover from the open position to the closed position induces the compressor to urge the object against the anvil to shatter the object.

In a preferred embodiment, the shatterable planar object is a plastic compact disc having at least one planar surface capable of electromagnetically storing data thereon. The at least one scatter shield preferably comprises two oppositely disposed, downwardly projecting scatter shields, the shields projecting downwardly from opposite edge portions of the top panel. The compressor preferably projects downwardly from a central portion of the top panel. The mounting fixture preferably has at least one slot formed therein for receiving and securely holding the shatterable planar object in the path the compressor traverses when the cover is urged from the open position to the closed position.

DETAILED DESCRIPTION OF PREFERRED EMBODIMENT(S)

Figure 1:
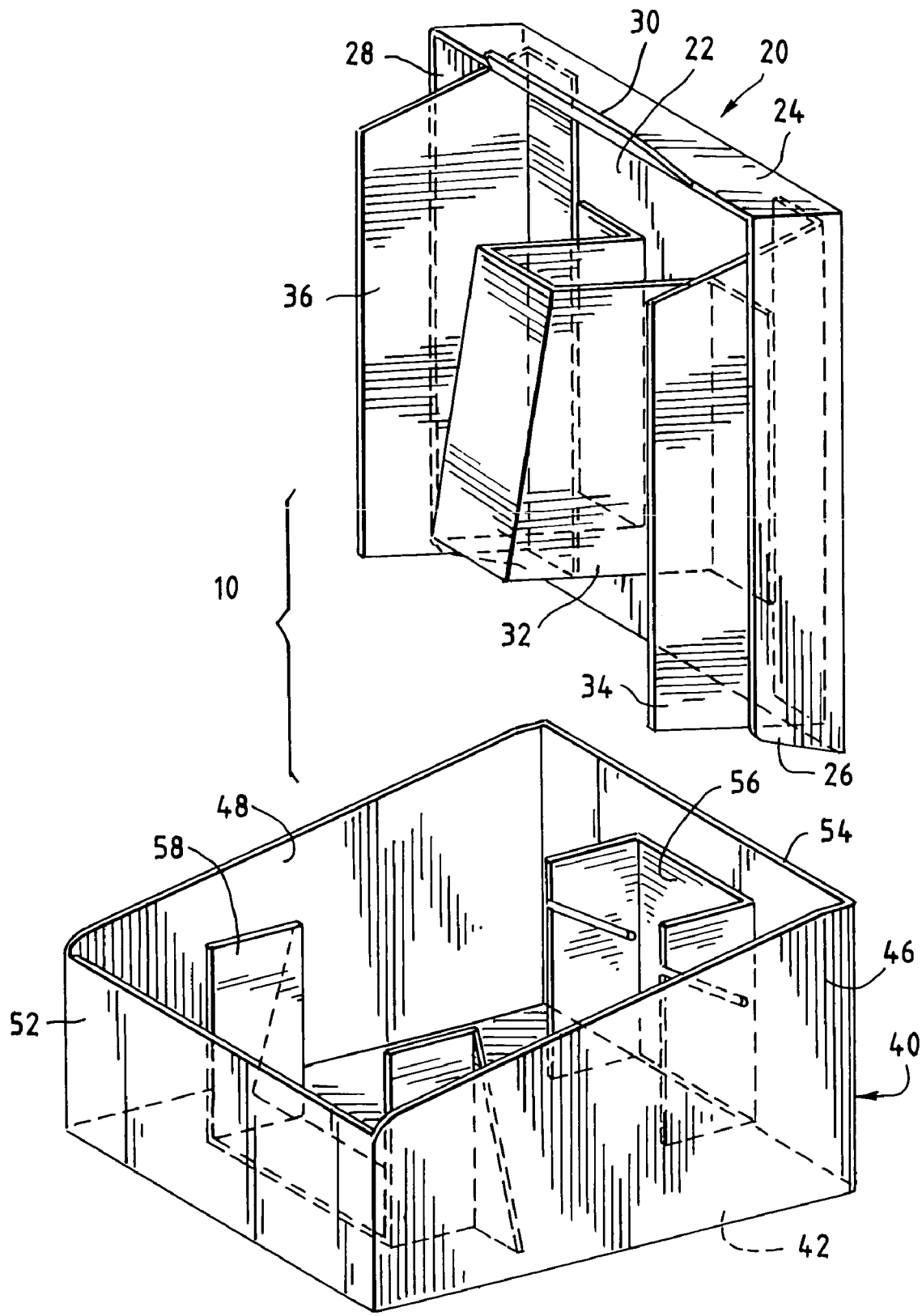
FIG. 1 is an exploded dimetric view of the present device for destroying compact discs.
Figure 4:
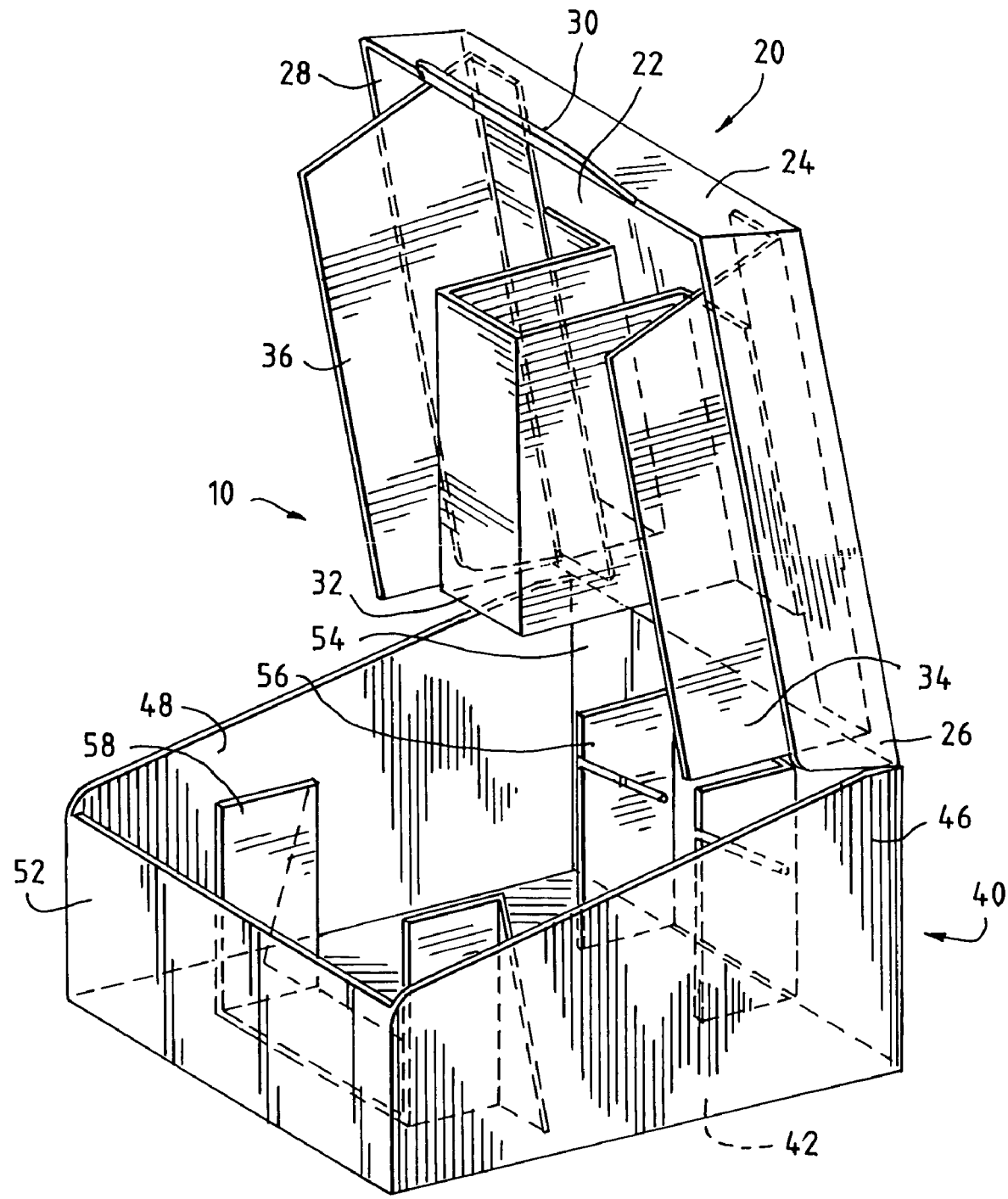
FIG. 4 is an dimetric view of the compact disc destruction device of FIG. 1, showing the device in the open position with the components in assembled form.

Turning to the FIGS. 1 and 4, the present compact disc destruction device 10 includes a base assembly 40 and a cover assembly 20. Base assembly 40 has a bottom panel 42 and walls 46, 48, 52, 54 projecting upwardly from each of the edges of bottom panel 42. A disc mounting fixture 56, which in the embodiment shown in the FIGS. 1 and 4 projects upwardly from the inwardly facing surface of bottom panel 42, is disposed in the interior of device 10.

As further shown in FIGS. 1 and 4, a mounting fixture 56 is attached to and projects upwardly from bottom panel 42. Mounting fixture 56 is capable of holding a shatterable planar object (shown in FIGS. 6 and 7 as compact disc 60). In the embodiment shown in the figures, mounting fixture 56 preferably includes a pair of spaced apart, upwardly extending members, each of which has a downwardly angled slot formed therein for accommodating the planar object to be destroyed.

Although mounting fixture 56 is illustrated in the figures as being attached to base wall 54 and projecting upwardly from bottom panel 42, mounting fixture 56 could be attached to and project from bottom panel 42 and/or one or more of base walls 46, 48.

An anvil 58 is attached to and projects upwardly from bottom panel 42. In the embodiment shown in the figures, anvil 58 preferably includes a pair of spaced apart upwardly extending members such that a CD-sized planar object mounted in the angled slots of mounting fixture 56 would extend over the anvil members.

Although anvil 58 is illustrated in the figures as being attached to and projecting upwardly from bottom panel 42, anvil 58 could be attached to and project inwardly from one or more of base walls 46, 48, 52.

As further shown in FIGS. 1 and 4, cover assembly 20 has a top panel 22 and walls 24, 26, 28 projecting downwardly from the side and front edges of top panel 22. Cover assembly 20 is hingedly attached to one of the upwardly projecting base walls (shown in FIGS. 1 and 4 as base wall 54), such that cover assembly 20 is capable of assuming an open position (shown in FIG. 4) in which the interior of device 10 is accessible from the exterior of the device, and a closed position (shown in FIG. 5) in which the interior of device 10 is inaccessible from the exterior of the device.

Cover assembly 20 shown in FIGS. 1 and 4 includes a pair of scatter shields 32, 34 projecting downwardly from the side edges of top panel 22, such that, in the closed position, scatter shields 32, 34 prevent the contents at the interior of device 10 from escaping to the exterior of device 10.

Cover assembly 20 further includes a compressor 32 that is attached to and projects downwardly from the interior surface of top panel 22. Compressor 32 is oriented so as to extend over a CD-sized planar object mounted in the angled slots of mounting fixture 56 of base assembly 40.

In operation, mounting CD 60 in the angled slots of mounting fixture 56 and urging the cover 20 from the open position (shown in FIG. 4) to the closed position (shown in FIG. 5) induces compressor 32 to urge CD 60, held in mounting fixture 56, against anvil 58 until CD 60 shatters as compressor 32 penetrates the space between the upwardly projecting members of anvil 58.

Figure 2:
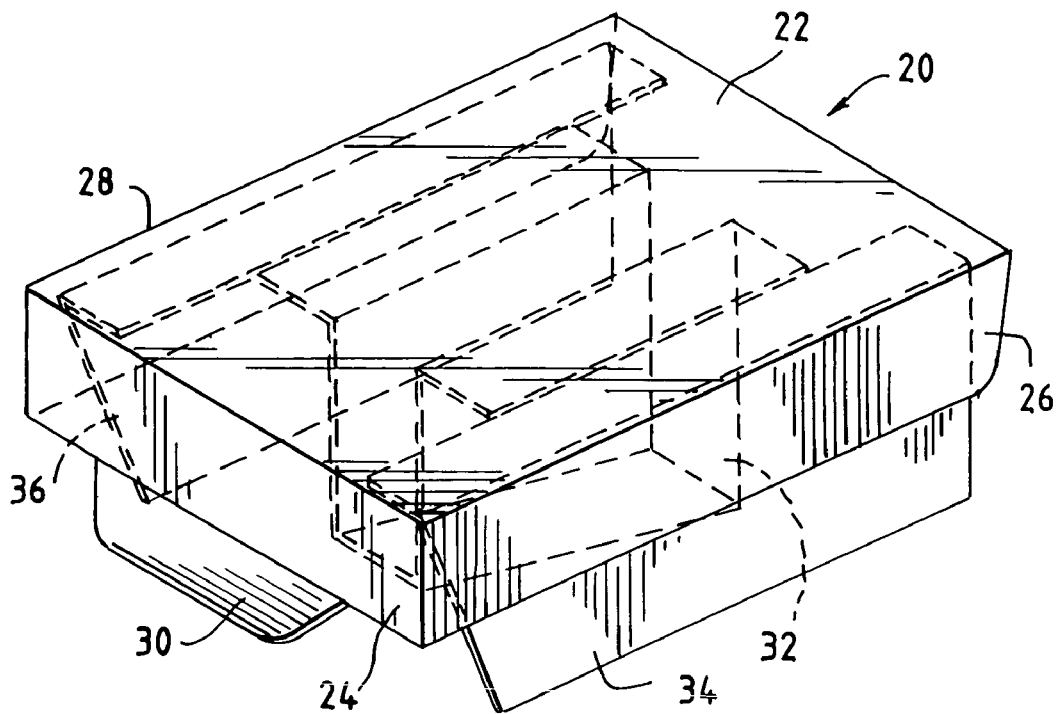
FIG. 2 is an dimetric view of the cover portion of the compact disc destruction device of FIG. 1, showing the compressor and scatter shields projecting downwardly from the inner surface of the cover.

FIG. 2 is an isolated view of cover assembly 20, which includes a top panel 22 and walls 24, 26, 28 projecting downwardly from the side and front edges of top panel 22. A pair of scatter shields 32, 34 project downwardly from the side edges of top panel 22. Compressor 32 is attached to and projects downwardly from the interior surface of top panel 22.

Figure 3:
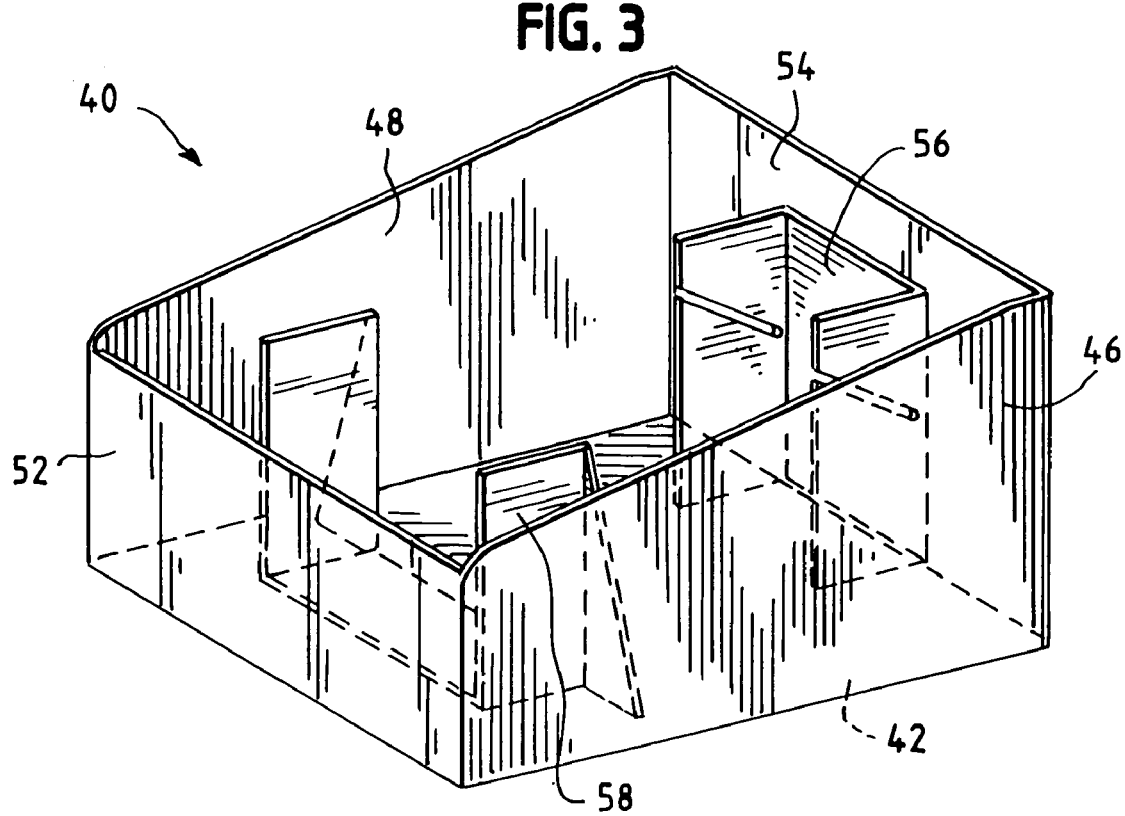
FIG. 3 is an dimetric view of the base portion of the compact disc destruction device of FIG. 1, showing the mounting fixture and anvil projecting from the bottom panel of the base.

FIG. 3 is an isolated view of base assembly 40, which includes a bottom panel 42 and walls 46, 48, 52, 54 projecting downwardly from each of the edges of bottom panel 42. A mounting fixture 56, capable of holding a CD or other shatterable planar object, is attached to and projects upwardly from bottom panel 42. Anvil 58 is attached to and projects upwardly from bottom panel 42.

Figure 5:
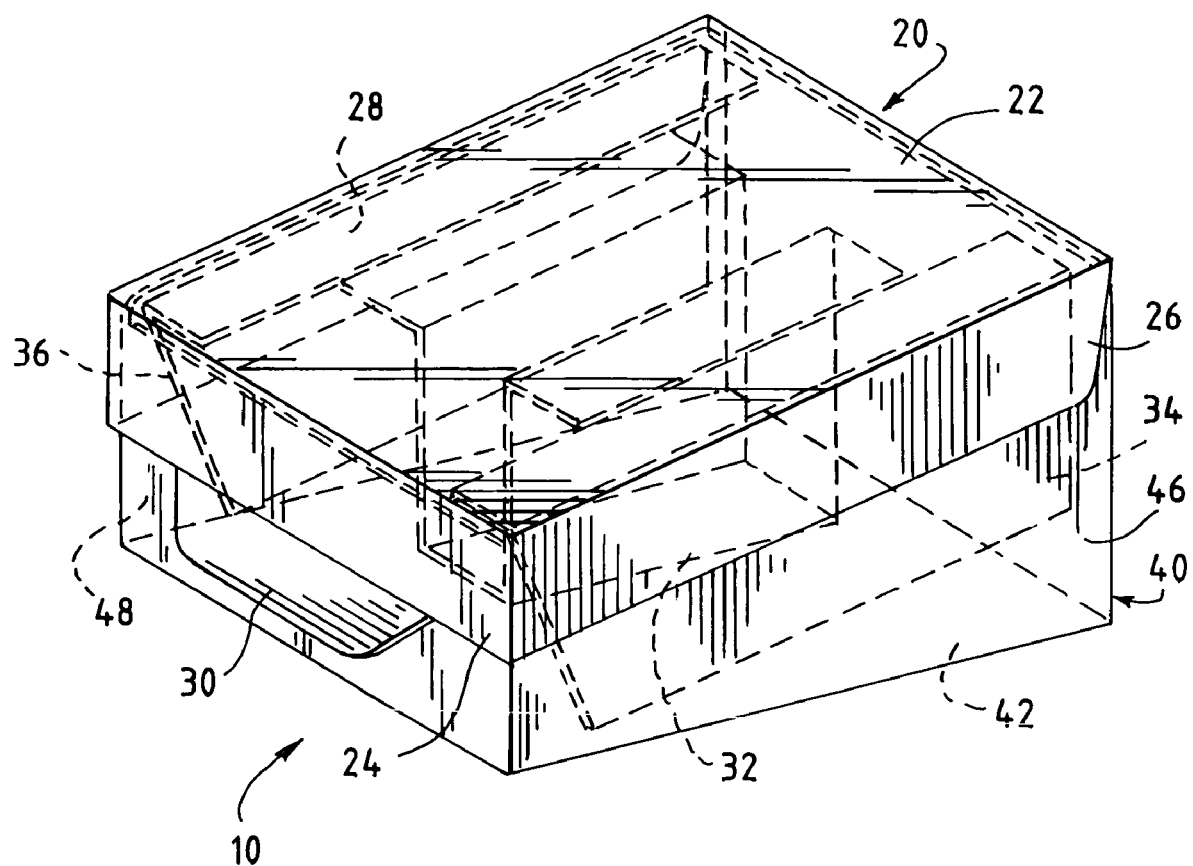
FIG. 5 is an dimetric view of the compact disc destruction device of FIG. 1, showing the device in the closed position, but with the anvil and mounting fixture omitted for illustrative purposes.

In FIG. 5, compact disc destruction device 10 is shown in the closed position, but with the anvil and mounting fixture omitted for illustrative purposes.

Figure 6:
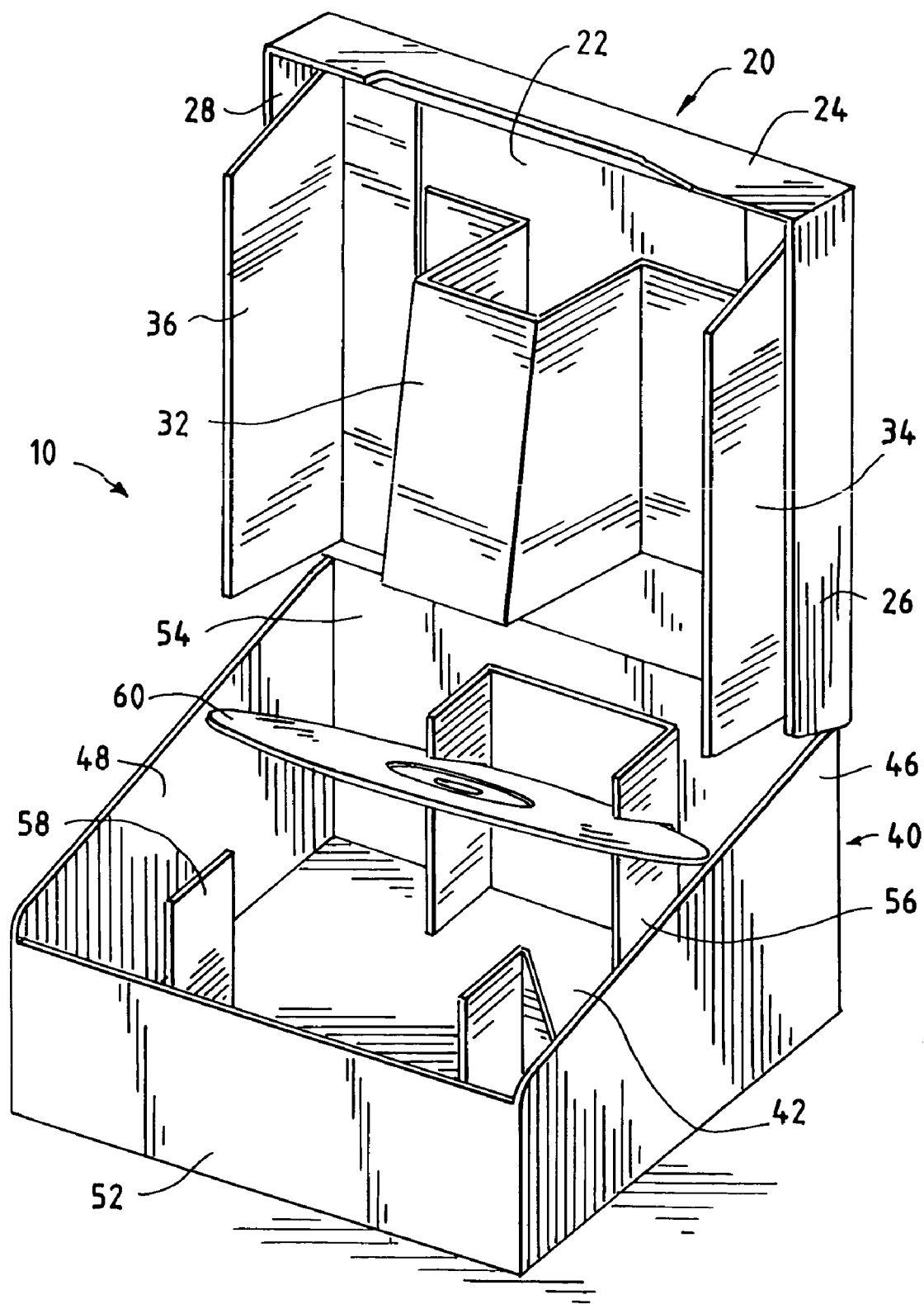
FIGS. 6 and 7 are dimetric views of the present compact disc destruction device in the open position, and in which a CD has been inserted in the mounting fixture at an angled orientation and in a position to be shattered upon closing the cover of the device.
Figure 7:
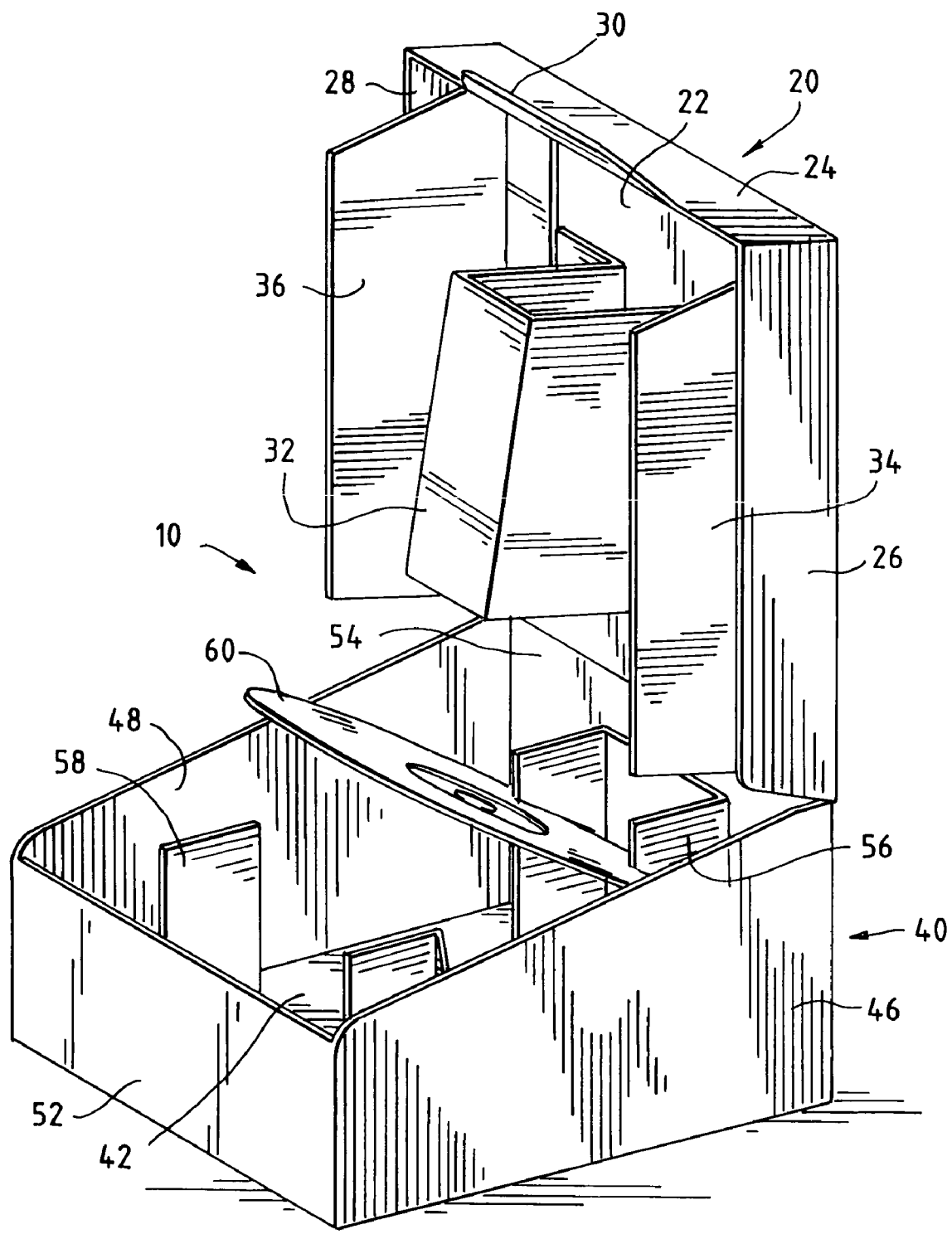

FIGS. 6 and 7 show compact disc destruction device in the open position, with a CD 60 inserted in mounting fixture 56 at an angled orientation and in a position to be shattered upon closing the cover 20 of the device.

The present device for destroying compact discs is superior to prior, conventional solutions in that the CD is shattered into many pieces, making reconstruction of the CD nearly impossible. Moreover, because the CD is fully contained in the device, the CD destruction process is rendered effective and safe. Additionally, the shattered pieces that result from the CD destruction process are readily disposable, and the plastic CD material is potentially recyclable, along with household or business waste materials.

The present CD destruction technique is preferable to prior, conventional techniques in that existing techniques to destroy CDs involve bending the CDs by hand until they shatter, thereby sending shards of sharp plastic material flying into the vicinity of the breaker and creating risk of injury to the breaker and bystanders. The present CD destruction device safely contains the broken CD shards in the interior of the device and renders the pieces readily disposable.

While particular steps, elements, embodiments and applications of the present invention have been shown and described, it will be understood, of course, that the invention is not limited thereto since modifications can be made by persons skilled in the art, particularly in light of the foregoing teachings. It is therefore contemplated by the appended claims to cover such modifications as incorporate those steps or elements that come within the scope of the present invention.

What is claimed is:

1. An apparatus for destroying a shatterable planar object, the apparatus comprising:
  (a) a base comprising a bottom panel and a plurality of base walls projecting upwardly from each of said bottom panel edges, said base comprising a mounting fixture capable of holding the shatterable planar object, said base further comprising an anvil projecting upwardly from said bottom panel;
  (b) a cover comprising a top panel and a plurality of walls projecting downwardly from said top panel edge, said cover hingedly attached to one of said base walls such that said cover is capable of assuming an open position in which the apparatus interior is accessible from the apparatus exterior and a closed position in which the apparatus interior is inaccessible from the apparatus exterior, said cover further comprising at least one scatter shield projecting downwardly from said top panel such that, in the closed position, the at least one scatter shield prevents the apparatus interior contents from escaping to the apparatus exterior, said cover further comprising a compressor projecting downwardly from said top panel,
whereby mounting a shatterable planar object in said mounting fixture and urging said cover from the open position to the closed position induces said compressor to urge said object against said anvil to shatter said object.

2. The apparatus of claim 1 wherein said shatterable planar object is a plastic compact disc having at least one planar surface capable of electromagnetically storing data thereon.

3. The apparatus of claim 1 wherein said at least one scatter shield comprises two oppositely disposed, downwardly projecting scatter shields, said shields projecting downwardly from opposite edge portions of said top panel.

4. The apparatus of claim 1 wherein said compressor projects downwardly from a central portion of said top panel.

5. The apparatus of claim 1 wherein said mounting fixture has at least one slot formed therein for receiving and securely holding said shatterable planar object in the path the compressor traverses when said cover is urged from the open position to the closed position.

* * * * *